US008340623B2

(12) United States Patent
Lu et al.

(10) Patent No.: US 8,340,623 B2
(45) Date of Patent: Dec. 25, 2012

(54) SELF-MIXING RECEIVER AND FORMING METHOD THEREOF

(75) Inventors: Shey Shi Lu, Taipei (TW); Yu Tso Lin, Taipei (TW); Fang Ren Liao, Taipei (TW)

(73) Assignee: National Taiwan University, Taipei (TW)

( * ) Notice: Subject to any disclaimer, the term of this patent is extended or adjusted under 35 U.S.C. 154(b) by 1047 days.

(21) Appl. No.: 11/951,481

(22) Filed: Dec. 6, 2007

(65) Prior Publication Data

US 2009/0034658 A1    Feb. 5, 2009

(30) Foreign Application Priority Data

Jul. 31, 2007    (TW) ................................ 96127997 A

(51) Int. Cl.
  *H04B 1/16*    (2006.01)
(52) U.S. Cl. ......... 455/334; 455/207; 455/313; 455/318
(58) Field of Classification Search .................... 455/334
  See application file for complete search history.

(56) References Cited

U.S. PATENT DOCUMENTS

| 6,735,421 | B1 * | 5/2004 | Claxton et al. ................ 455/207 |
| 7,016,654 | B1 * | 3/2006 | Bugeja ............................. 455/73 |
| 7,423,566 | B2 * | 9/2008 | Chen ............................. 341/143 |
| 2003/0102916 | A1 * | 6/2003 | Yu et al. ......................... 330/253 |
| 2003/0114129 | A1 * | 6/2003 | Jerng ............................. 455/323 |
| 2007/0018727 | A1 * | 1/2007 | Lee et al. ........................ 330/254 |
| 2007/0139112 | A1 * | 6/2007 | Bocock et al. ................. 330/253 |
| 2007/0178866 | A1 * | 8/2007 | Beukema et al. ........... 455/190.1 |
| 2008/0032659 | A1 * | 2/2008 | Chang et al. ................... 455/323 |
| 2010/0093299 | A1 * | 4/2010 | Pinel et al. .................. 455/226.1 |

OTHER PUBLICATIONS

"Direct-conversion CMOS transceiver with automatic frequency control for 802.11a wireless LANs", A. Behzad et al., IEEE International Solid-State Circuits Conference, 2003.

* cited by examiner

*Primary Examiner* — Duc Nguyen
*Assistant Examiner* — Ajibola Akinyemi
(74) *Attorney, Agent, or Firm* — Rabin & Berdo, P.C.

(57) ABSTRACT

This invention is primarily a circuit structure of self-mixing receiver, and the methodology of circuit structure is described as follows. The first stage is a high input impedance voltage amplifier utilized to amplify the received RF carrier signal from the antenna. Besides, there are no any inductors required. The second stage is a multi-stage amplifier to amplify the output signal of first stage to rail-to-rail level, which is quite the same with supply voltage. The third stage is a mixer adopted to lower the signal frequency. The fourth stage is a digital output converter, which is proposed to demodulate the electric signals and convert the demodulated signal to digital signal.

16 Claims, 8 Drawing Sheets

| Features | Measured performance |
|---|---|
| Supply voltage | 0.5 V |
| Carrier frequency | 100-1900MHz |
| Sensitivity | < -70dBm at 150MHz<br>< -48dBm at 433MHz |
| Max data rate | ~2Mbps |
| Max input rate | -15dBm at 150MHz<br>-3dBm at 433MHz |
| Power dissipation | 3.1mW |
| Circuit area | 380um x 220um |

FIG. 8

SELF-MIXING RECEIVER AND FORMING METHOD THEREOF

FIELD OF THE INVENTION

The present invention relates to a receiver, and more particularly, to a self-mixing receiver and forming method for wireless network system and biomedical wireless communication system.

BACKGROUND OF THE INVENTION

A conventional receiver is usually added with external components to receive different kinds of signals effectively. With reference to FIG. 1 to illustrate a super heterodyne receiver 1. The super heterodyne receiver 1 includes a low noise amplifier 11, a mixer 13, a voltage-controlled oscillator 14, and a demodulator 16, and the super heterodyne receiver 1 is added with an image rejection filter 12 and an IF filter 15. Thus, the super heterodyne receiver 1 needs large circuit area and large power dissipation.

To overcome the shortcomings of large circuit area and power dissipation, the method of amplitude-shift keying (ASK) is utilized with envelop detection to lower circuit area and power dissipation. For example, "Direct-conversion CMOS transceiver with automatic frequency control for 802.11a wireless LANs" published on International Solid-State Circuits Conference, 2003, described the transceiver including an inductor disposed on a chip to serve as a first-stage passive loaded circuit, and an inductor disposed outside the chip to match with an antenna. Besides, the transceiver needed to be accomplished with baseband demodulation circuits, thereby occupying circuit areas about 2 mm×1 mm. Consequently, the transceiver still consumed quite large circuit areas, and it is necessary to be improved for applications in the fields of wireless bio-diagnosis monitoring network and personal health monitoring system.

Furthermore, though the demodulator circuits have the advantage of low power dissipation, conventional demodulator circuits of amplitude modulation (AM) and amplitude-shift keying (ASK) result in very low transmission rate for the effect of clipping. The effect of clipping is caused by a big RC time constant, and the RC time constant makes the signal waveform partially clipped. As illustrated in FIG. 2, the waveform is turned off by a diode while the packet waveform falling faster than RC time constant frequency. Accordingly, the fall exponential waveform A is different from the original waveform, and the required packet signals are broken. Therefore, how to improve the shortcoming by circuit design is an important issue of the technology.

SUMMARY OF THE INVENTION

Generally, inductors in standard manufacturing process are planar spiral structure, and inductors approximate a few nano-Henry will occupy over half a circuit area, so that the bulky chip is necessary for installing the inductors. Consequently, to reduce the amount of used inductors will lower the required circuit area and power dissipation.

Accordingly, when a self-mixing receiver could stably receive electric signals and transmit digital signals without any inductors disposed, it is very helpful for the development of ultra-wideband short-range communication systems, wireless network, and other miniaturized ultra-wideband short-range transmission products.

The primary objective of the present invention is to provide a self-mixing receiver to receive electric signals and transmit digital signals. The circuit structure of the self-mixing receiver comprises a high input impedance voltage amplifier, a multi-stage amplifier, a mixer, and a digital output converter, wherein the high input impedance voltage amplifier includes an input end utilized to be the input end of self-mixing receiver, and the multi-stage amplifier is connected to the output end of high input impedance voltage amplifier. Besides, the mixer is connected to the output end of multi-stage amplifier. Moreover, the digital output converter is connected to the output end of mixer, and includes a low pass filter, a voltage comparator, and a digital inverter.

Another objective of the present invention is to provide a method for forming a self-mixing receiver to receive electric signals and transmit digital signals. The forming method comprising the steps of: a. amplifying electric signals by a high input impedance voltage amplifier and a multi-stage amplifier; b. lowering the frequency of electric signals by a mixer; and c. demodulating and transmitting digital signals by a digital output converter to demodulate the amplified electric signals and convert the demodulated signals to digital signals.

Moreover, the self-mixing receiver of the present invention is provided with four cascaded stages, wherein the first stage is the high input impedance voltage amplifier. The circuit structure of the high input impedance voltage amplifier is composed of a resistor, a capacitor, and a transistor, to receive and amplify signals. Furthermore, the high input impedance voltage amplifier is a common source amplifier, a cascade amplifier, a common gate amplifier, or a CMOS amplifier.

Then, the second stage is the multi-stage amplifier, and the circuit structure of the multi-stage amplifier is composed of a resistor and a plurality of transistors to amplify signals to rail-to-rail level, which is quite the same with supply voltage. In addition, the multi-stage amplifier is a common source amplifier, a cascade amplifier, a common gate amplifier, or a CMOS amplifier.

Subsequently, the third stage is the mixer, and the mixer is a gilbert mixer or a sub-harmonic mixer. The circuit structure of the mixer includes a plurality of differential amplifiers, a plurality of resistors, and a plurality of capacitors to lower the signal frequency to DC level and avoid the effect of clipping.

Finally, the fourth stage is the digital output converter, and the digital output converter includes a low pass filter, a voltage comparator, and a digital inverter, wherein the low pass filter is composed of a resistor and a capacitor to filter a twice-frequency signal to obtain a DC signal. The voltage comparator is composed of an operational amplifier, a differential amplifier, or a transconductance amplifier to transform the DC signal to a digital signal. The digital inverter is composed of digital logic gates, and adopted to output the digital signal.

Furthermore, the electric signal received by the self-mixing receiver is an amplitude-shift keying (ASK) signal or amplitude modulated (AM) signal. Besides, the capacitors utilized in the present invention are MIN capacitors, PN Junction capacitors, or MOS capacitor, and the resistors are poly-silicon resistors or N-well resistors.

Accordingly, the self-mixing receiver of the present invention could receive electric signals and transmit digital signals without any inductors. Therefore, the shortcomings of large circuit area and power dissipation could be overcome by the self-mixing receiver.

BRIEF DESCRIPTIONS OF THE DRAWINGS

The foregoing aspects, as well as many of the attendant advantages and features of this invention will become more apparent by reference to the following detailed description, when taken in conjunction with the accompanying drawings, wherein:

FIG. 8 illustrates the performance of the chip;

DETAILED DESCRIPTIONS OF THE PREFERRED EMBODIMENT

Figure 1:
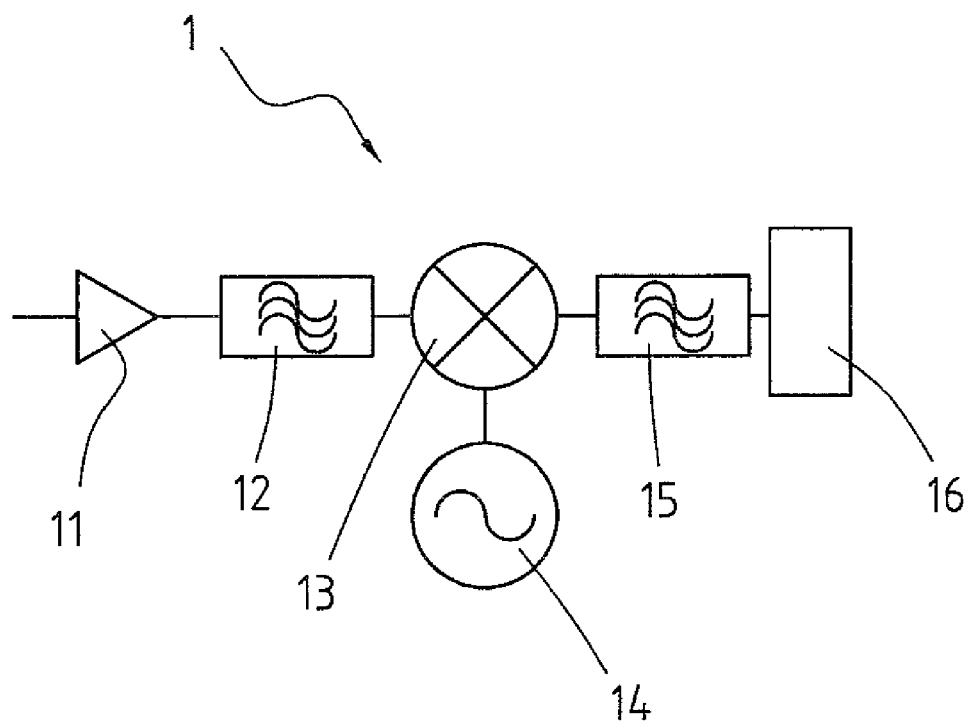
FIG. 1 illustrates the conventional super heterodyne receiver.
Figure 2:
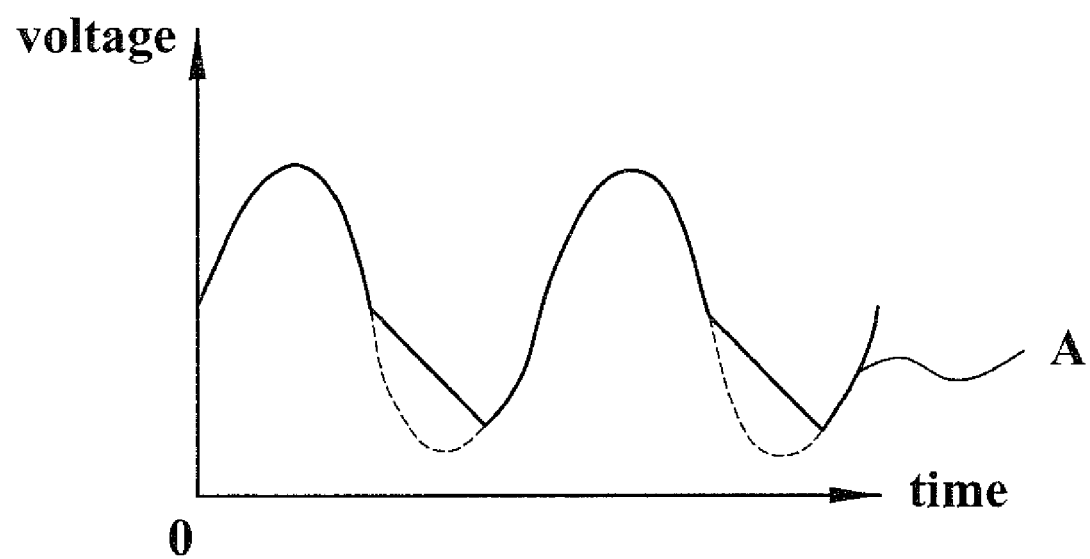
FIG. 2 illustrates the effect of clipping.
Figure 3:
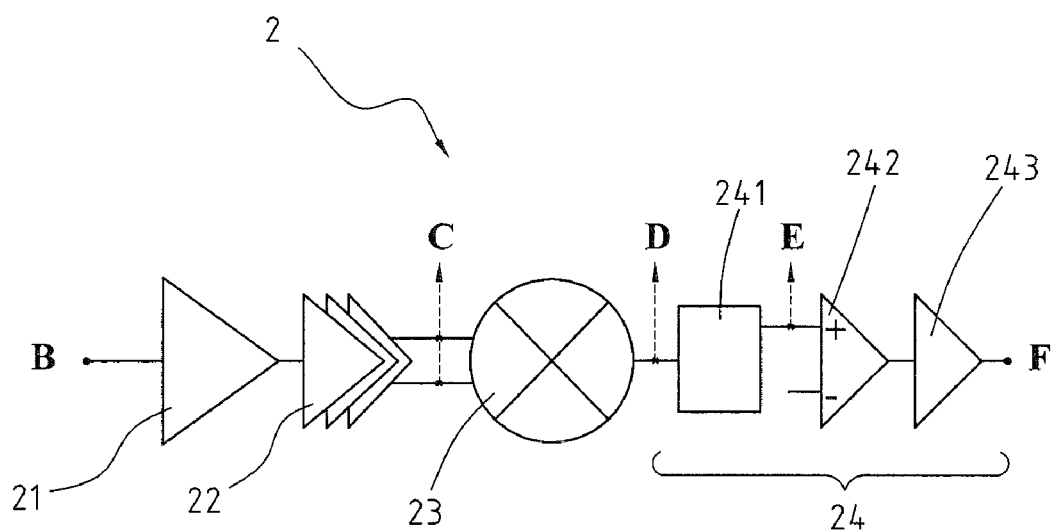
FIG. 3 illustrates the formation of the self-mixing receiver.

FIG. 3 illustrated the formation of the self-mixing receiver. As shown in FIG. 3, the self-mixing receiver is a four-cascaded stage architecture to receive electric signals and transmit digital signals. The circuit structure of the self-mixing receiver 2 comprises a high input impedance voltage amplifier 21, a multi-stage amplifier 22, a mixer 23, and a digital output converter 24, wherein the high input impedance voltage amplifier 21 including an input end utilized to be the electric signal receiving terminal B of self-mixing receiver 2. Additionally, the multi-stage amplifier 22 is connected to the output end of high input impedance voltage amplifier 21, and the mixer 23 is connected to the output end C of multi-stage amplifier 22. Besides, the digital output converter 24, connected to the output end D of mixer 23, includes a low pass filter 241, a voltage comparator 242, and a digital inverter 243, wherein the positive input end of voltage comparator 242 connected to the output end E of low pass filter 241, and the output end of digital output converter 24 utilized to be the digital signal output end F of the self-mixing receiver 2

Figure 4A:
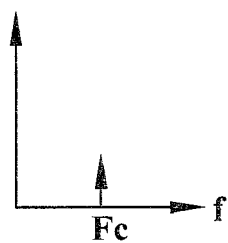
FIG. 4A illustrates the spectrum diagram of B terminal in FIG. 3.
Figure 4B:
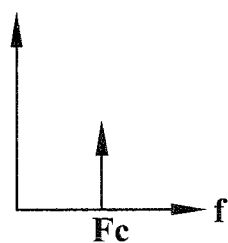
FIG. 4B illustrates the spectrum diagram of C terminal in FIG. 3.
Figure 4C:
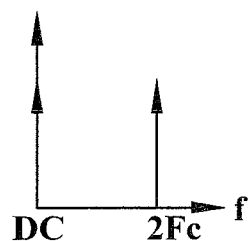
FIG. 4C illustrates the spectrum diagram of D terminal in FIG. 3.
Figure 4D:
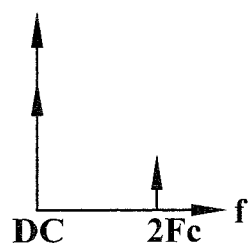
FIG. 4D illustrates the spectrum diagram of E terminal in FIG. 3.

Subsequently, with reference to FIG. 3 and FIGS. 4A~4D, wherein FIGS. 4A~4D illustrating the spectrum diagrams of B, C, D, and E terminal in FIG. 3. The spectrum diagram illustrated in FIG. 4A is estimated from the electric signal receiving terminal B of self-mixing receiver 2 when the self-mixing receiver 2 received a signal. Then, referring to FIG. 4B, the frequency of the received signal is amplified to rail-to-rail level, which is quite the same with supply voltage by the high input impedance voltage amplifier 21 and multi-stage amplifier 22. Furthermore, as shown in FIG. 4C, the amplified signal is transformed to a DC signal and a twice-frequency signal through self-mixing of the mixer 23, and the twice-frequency signal is filtered out by the low pass filter 241 of the digital output converter 24. As illustrated in FIG. 4D, the DC signal is left after the twice-frequency signal had been filtered out. At last, the DC signal is transformed to a digital signal by the voltage comparator 242 and the digital inverter 243.

Figure 5:
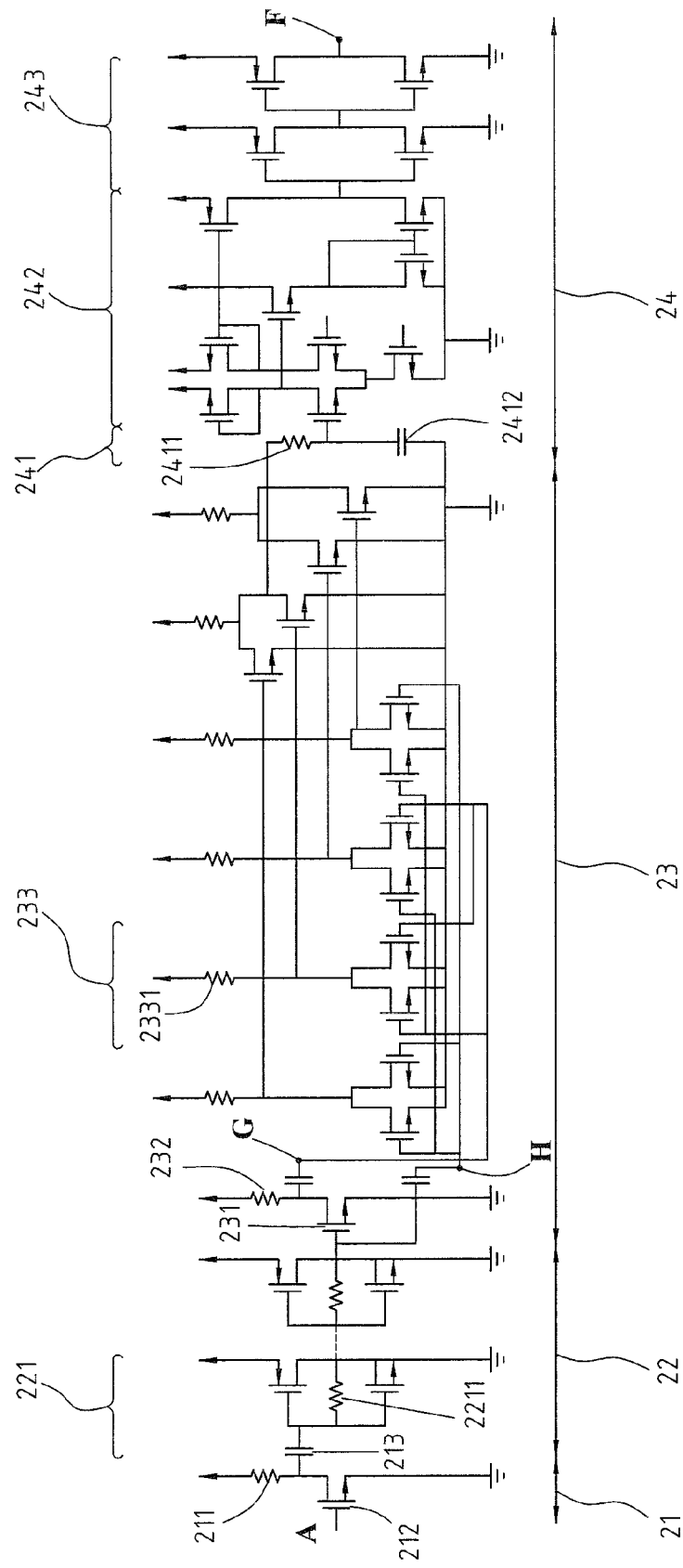
FIG. 5 illustrates the circuit diagram of the self-mixing receiver.

In the present invention, the preferred embodiment to implement a self-mixing receiver is demonstrated by a 0.18 µm Si CMOS process. Furthermore, with reference to FIG. 5 illustrating the circuit diagram of the self-mixing receiver. The first stage circuit of the self-mixing receiver 2 is the high input impedance voltage amplifier 21 composed of a resistor 211, a capacitor 213, and a transistor 212 to receive and amplify signals. In this embodiment, the transistor 212 is a metal-oxide-semiconductor (MOS) transistor, and the gate of transistor 212 is used as the input end of the high input impedance voltage amplifier 2, the source grounded, and the drain connected to the resistor 211 and further to the power, additionally, the drain also connected to the capacitor 213 to block the DC bias of the next stage circuit.

The second stage circuit of the self-mixing receiver 2 is the multi-stage amplifier 22, and the circuit structure of the multi-stage amplifier 22 could be a plurality of common source amplifiers, a plurality of cascade amplifiers, a plurality of common gate amplifiers or a plurality of CMOS amplifiers. In this embodiment, the circuit structure of the multi-stage amplifier 22 is composed of a pair of complementary-metal-oxide-semiconductor (CMOS) amplifier 221, and each CMOS amplifier 221 is composed of P-Metal-Oxide-Semiconductor (PMOS) transistor, a N-Metal-Oxide-Semiconductor (NMOS) transistor, and a loading resistor 2211, wherein the PMOS transistor and NMOS transistor contribute high voltage gain and share the same DC power. Therefore, the self-mixing receiver 2 of the present invention could reduce half power dissipation to amplify signals under same voltage gain.

The third stage circuit of the self-mixing receiver 2 is the mixer 23 connected to the output end of multi-stage amplifier 22, and the circuit structure of the mixer 23 is composed of a plurality of differential amplifiers 233, a plurality of resistors 2331, and a plurality of capacitors. In this embodiment, the gate of a MOS transistor 231 is utilized to be the input end of the mixer 23, the drain connected to a resistor 232 utilized to transform the amplified signal to differential voltage signal. Then, six differential amplifiers 233 are connected, wherein every differential amplifier 233 is composed of a plurality of transistors. The drains of transistor of every differential amplifier 233 are connected to a supply voltage via a resistor 2331, and the source of transistor grounded. Two inputs of one differential amplifier 233 are connected to the negative output end H, and the input ends of another differential amplifier 233 are connected to the positive output end G. Besides, one input end of another two differential amplifiers 233 connected to the positive output end G, and the other input end connected to the negative output end H. Finally, the input ends of remaining two differential amplifiers 233 are connected to the drains of above four differential amplifiers 233, and the drains of the two differential amplifiers 233 are utilized to be the output end of the mixer 23. Thus, the circuit composed of the differential amplifiers 233 could tolerate large input amplitudes to result in large power range of input, and there is not any gain-control mechanism required to handle extremely large signals. Accordingly, the power dissipation and circuit area are reduced.

The fourth stage circuit of the self-mixing receiver 2 is a digital output converter 24 including a low pass filter 241, a voltage comparator 242, and a digital inverter 243, wherein the low pass filter 241 is composed of a resistor 2411 and a capacitor 2412 to filter a twice-frequency signal to obtain a DC signal. The voltage comparator 242 includes a differential amplifier with diode loaded and a transconductance amplifier, wherein the elements of the amplifiers are a plurality of transistors adopted to transform DC signals to rail-to-rail digital signals. Moreover, the elements of the digital inverter 243 are also a plurality of transistors.

Therefore, as mentioned above, no inductors are utilized in the circuit structure of the self-mixing receiver, and the shortcoming of large circuit area could be avoided consequently.

Furthermore, a method for forming the self-mixing receiver comprises the steps of: a. amplifying electric signals by a high input impedance voltage amplifier and a multi-stage amplifier; b. lowering the frequency of electric signals by a mixer; and c. demodulating and outputting digital signals by a digital output converter to demodulate the amplified electric signals and convert the demodulated signals to digital signals.

Figure 6:
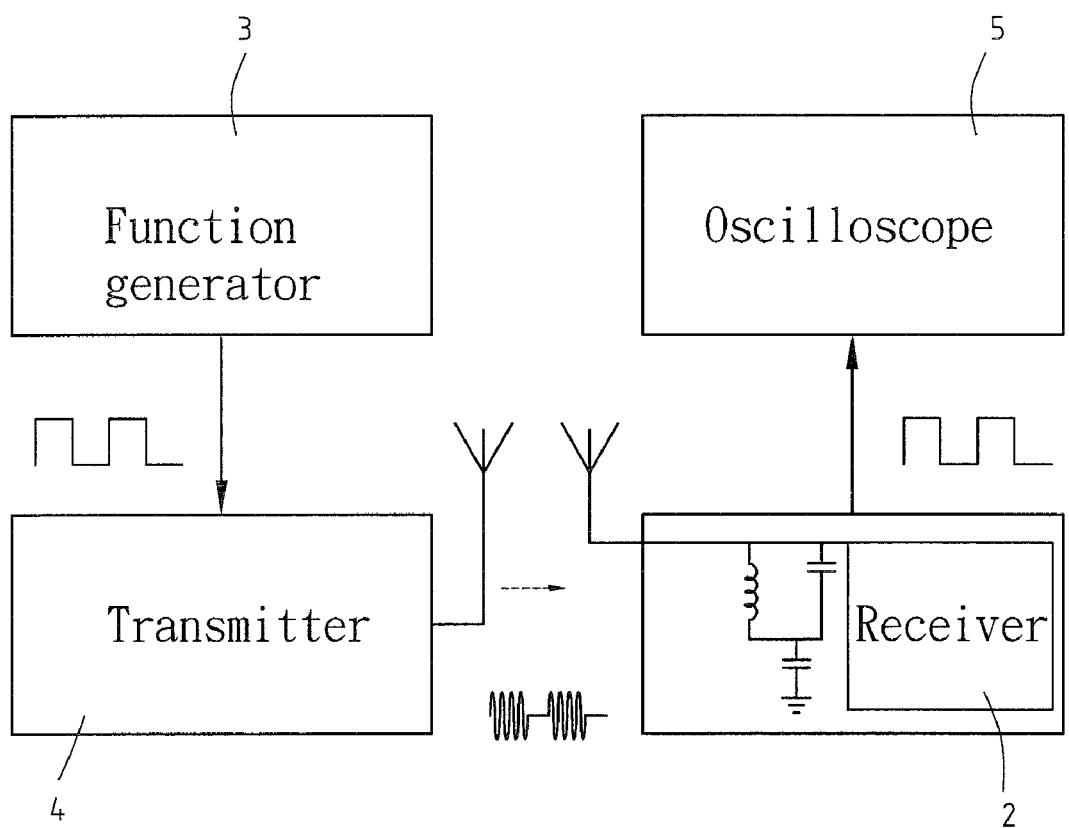
FIG. 6 illustrates the wireless transmission and receiving.
Figure 7:
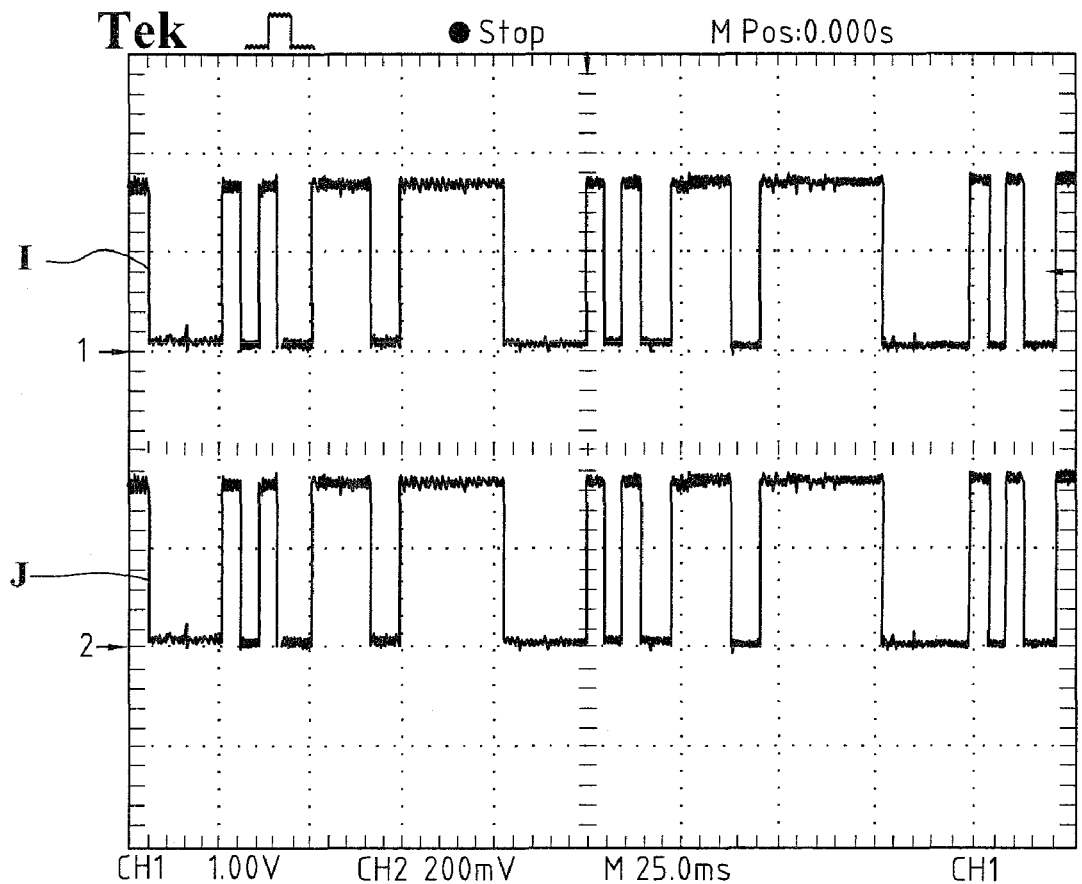
FIG. 7 illustrates the digital signals of transmitting terminal and receiving terminal.

In addition, referring to FIG. 6 to illustrate the wireless transmission and receiving. A transmitter 4 is connected to a function generator 3 to transmit an electric signal, and then the signal is received by the self-mixing receiver 2 and observed via the oscilloscope 5. Afterward, the observed data is showed in FIG. 7 illustrating the digital signals of transmitting terminal and receiving terminal. By comparing the digital signal waveform J of transmitting terminal with the digital signal waveform I of receiving terminal, we knew that the self-mixing receiver received the signal stably via tiny signal (about 200 μV).

With reference to FIG. 8 illustrating the performance of the chip. The circuit area is only 380 μm×220 μm. In this embodiment, the carrier frequency of the self-mixing receiver is able to operate between 100 MHz and 1900 MHz to receive electric signals in a broad frequency range when the supply voltage is at 0.5V. Besides, the self-mixing receiver is provided with a high transmission rate, and the max data rate is up to 2 Mbps. In addition, the self-mixing receiver is provided with substantial improvement in power dissipation and circuit area to overcome the shortcoming of prior arts.

While the invention has been particularly shown and described with reference to the preferred embodiments thereof, these are merely examples to help clarify the invention and are not intended to limit the invention. It will be understood by those skilled in the art that various changes, modifications, and alterations in form and details may be made therein without departing from the spirit and scope of the invention, as set forth in the following claims.

What is claimed is:

1. A self-mixing receiver, used to receive electric signals and transmit digital signals, comprising:
    a high input impedance voltage amplifier, including an input end utilized to be the input end of the self-mixing receiver, wherein the high input impedance voltage amplifier consists of at least one resistor, at least one capacitor, and a transistor to receive and amplify signals, a gate of the transistor used as the input end of the high input impedance voltage amplifier, a source of the transistor grounded, and a drain of the transistor connected to the resistor and capacitor;
    a multi-stage amplifier, connected to an output end of the high input impedance voltage amplifier;
    a mixer, having an input end connected only to an output end of the multi-stage amplifier, utilized to lower the signal frequency to DC level, the mixer consisting of:
        a plurality of differential voltage amplifiers, each amplifier further consisting of a plurality of transistors;
        a plurality of resistors; and
        a plurality of capacitors,
    wherein the mixer takes the gate of one of the plurality of transistors as the input end of mixer, the drain as the positive output end, and the gate as the negative output end; and
    a digital output converter, connected to an output end of the mixer, including a low pass filter, a voltage comparator, and a digital inverter.

2. The self-mixing receiver of claim 1, wherein the electric signal is an amplitude-shift keying (ASK) signal or amplitude modulated (AM) signal.

3. The self-mixing receiver of claim 1, wherein the high input impedance voltage amplifier is a common source amplifier, a cascade amplifier, a common gate amplifier, or a CMOS amplifier.

4. The self-mixing receiver of claim 1, wherein the multi-stage amplifier is a common source amplifier, a cascade amplifier, a common gate amplifier, or a CMOS amplifier.

5. The self-mixing receiver of claim 1, wherein the multi-stage amplifier is composed of a resistor and a plurality of transistors to amplify signals.

6. The self-mixing receiver of claim 5, wherein the transistors of multi-stage amplifier includes a P-Metal-Oxide-Semiconductor (PMOS) transistor and a N-Metal-Oxide-Semiconductor (NMOS) transistor, the gates of the transistors connected to the input end of mixer, the drains connected mutually and connected to the gates via a resistor, and the sources utilized to be a ground terminal and a power terminal of the multi-stage amplifier respectively.

7. The self-mixing receiver of claim 5, wherein the resistor is a polysilicon resistor or an N-well resistor.

8. The self-mixing receiver of claim 1, wherein the mixer is a Gilbert mixer or a sub-harmonic mixer.

9. The self-mixing receiver of claim 1, wherein the low pass filter is composed of a resistor and a capacitor.

10. The self-mixing receiver of claim 9, wherein the capacitor is a MIN capacitor, a PN Junction capacitor, or a MOS capacitor.

11. The self-mixing receiver of claim 9, wherein the resistor is a polysilicon resistor or an N-well resistor.

12. The self-mixing receiver of claim 1, wherein the voltage comparator is composed of an operational amplifier, a differential amplifier, or a transconductance amplifier.

13. The self-mixing receiver of claim 12, wherein the mixer includes six differential amplifiers, the drain of transistor of every differential amplifier and a resistor connected to a supply voltage, the source of transistor grounded, the input end of one differential amplifier connected to the negative output end, the input end of another differential amplifier connected to the positive output end, one input end of another two differential amplifiers connected to the positive output end and the other input end connected to the negative output end, and the input ends of remaining two differential amplifiers connected to the drains of above four differential amplifiers and the drains of the two differential amplifiers utilized to be the output end of the mixer.

14. The self-mixing receiver of claim 1, wherein the digital inverter is composed of digital logic gates.

15. The self-mixing receiver of claim 1, wherein the capacitor is a MIN capacitor, a PN Junction capacitor, or a MOS capacitor.

16. The self-mixing receiver of claim 1, wherein the resistor is a polysilicon resistor or an N-well resistor.

* * * * *